US008692950B2

(12) United States Patent
Lee et al.

(10) Patent No.: US 8,692,950 B2
(45) Date of Patent: *Apr. 8, 2014

(54) DISPLAY PANEL INCLUDING A SOFT KEY

(75) Inventors: Choon-Hyop Lee, Yongin (KR);
Sung-Ku Kang, Yongin (KR);
Jung-Mok Park, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 447 days.

This patent is subject to a terminal disclaimer.

(21) Appl. No.: 12/926,794

(22) Filed: Dec. 9, 2010

(65) Prior Publication Data

US 2011/0242465 A1    Oct. 6, 2011

(30) Foreign Application Priority Data

Apr. 1, 2010  (KR) .................... 10-2010-0029949

(51) Int. Cl.
*G02F 1/1333*    (2006.01)

(52) U.S. Cl.
USPC ............. 349/58; 349/40; 349/151; 349/61; 349/12; 345/173

(58) Field of Classification Search
USPC ................... 349/40, 58, 15; 345/173
See application file for complete search history.

(56) References Cited

U.S. PATENT DOCUMENTS

| | | | |
|---|---|---|---|
| 4,588,267 A * | 5/1986 | Pastore | 359/636 |
| 4,882,565 A * | 11/1989 | Gallmeyer | 340/461 |
| 6,181,344 B1 * | 1/2001 | Tarpenning et al. | 715/863 |
| 7,109,990 B1 * | 9/2006 | Oler et al. | 345/428 |
| 7,379,139 B2 * | 5/2008 | Yamazaki | 349/116 |
| 7,540,620 B2 * | 6/2009 | Weller et al. | 359/879 |
| 7,629,613 B2 * | 12/2009 | Sohn et al. | 257/72 |
| 7,808,586 B2 * | 10/2010 | Mochizuki | 349/110 |
| 7,808,608 B2 * | 10/2010 | Park et al. | 349/191 |
| 8,224,391 B2 * | 7/2012 | Kim et al. | 455/566 |
| 2005/0253976 A1 * | 11/2005 | Sekiguchi et al. | 349/40 |
| 2008/0143683 A1 * | 6/2008 | Hotelling | 345/173 |

FOREIGN PATENT DOCUMENTS

| | | |
|---|---|---|
| KR | 10 2003-0075073 A | 9/2003 |
| KR | 10 2005-0008191 A | 1/2005 |
| KR | 10-2005-0121640 A | 12/2005 |
| KR | 10 2007-0010171 A | 1/2007 |
| KR | 10 2008-0079808 A | 9/2008 |
| KR | 10-2009-0035219 A | 4/2009 |

OTHER PUBLICATIONS

Korean Office Action in KR 10-2010-0029949, dated Jun. 24, 2011 (Lee, et al.).

* cited by examiner

*Primary Examiner* — Edward Glick
*Assistant Examiner* — Sang V Nguyen
(74) *Attorney, Agent, or Firm* — Lee & Morse, P.C.

(57) ABSTRACT

A display panel includes a transparent substrate, a picture region, a black matrix region around the picture region, and a soft key region, a black matrix formed in the black matrix region on one side of the transparent substrate and having a first opening in the soft key region, and an overcoating layer on the transparent substrate including the black matrix, wherein a soft key is implemented in the soft key region by disposing a light source under the first opening of the black matrix. When the display panel is a touch screen panel, conductive sensing cells in the picture region and position detection lines in the black matrix region are included.

19 Claims, 3 Drawing Sheets

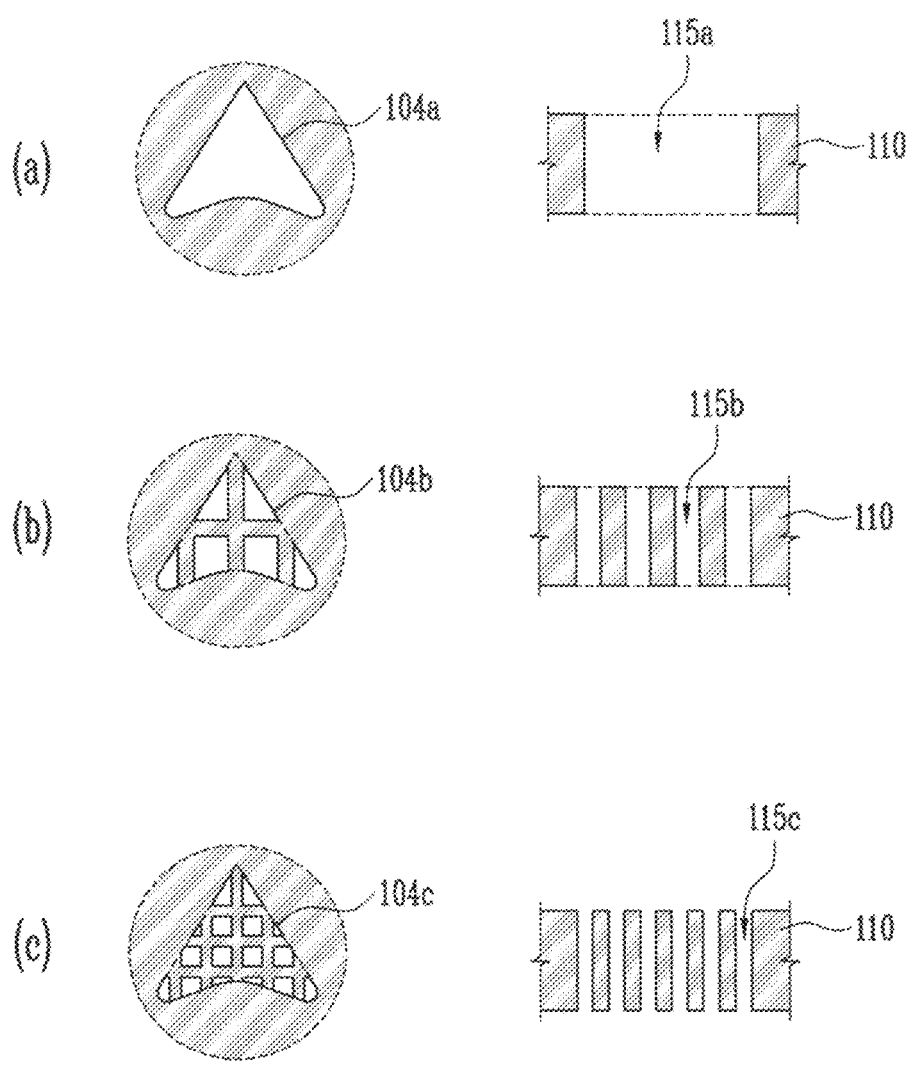

DISPLAY PANEL INCLUDING A SOFT KEY

BACKGROUND

1. Field

Embodiments relate to a panel, more particularly, to a touch screen panel, that includes a soft key.

2. Description of the Related Art

A touch screen panel is an input device that selects contents displayed on a screen, e.g., an image display device, etc., using a person's hand or an object to input commands of a user. The touch screen panel is provided on a front face of the image display device and converts positions on the touch screen panel directly contacting the person's hand or object into electrical signals. Accordingly, the instruction selected at the contact position is received as an input signal. As the touch screen panel can replace a separate input device that is operated by being connected with the image display device, e.g., a keyboard or a mouse, the use field of the touch screen panel is being expanded gradually.

The touch screen panel includes sensing cells in a picture region that recognize a touch event in the picture region. That is, in an image display device equipped with a touch screen panel, a picture region is a display region that displays images and a touch active region through which a touch input is possible.

Soft keys, such as a function key or a volume key, are provided at one side of the picture region for convenience. Soft key is disposed close to the screen for standing out from the user. Therefore, a shape and an implementing way, etc. of the soft key have an effect on appearance of the display device.

Meanwhile, the soft key can be marked with a special coating, such as printing, layer attaching. In this case, a process for forming the soft key should be further performed, and also when the image display device is switched off, the soft key is only being magnified, so that it can be a problem that there is no sense of unity in colors.

SUMMARY

Embodiments are therefore directed to a display panel and touch screen panel, which substantially overcome one or more of the problems due to the limitations and disadvantages of the related art.

It is therefore a feature of an embodiment to provide a touch screen panel and display panel having a soft key implemented when forming other parts of the panel.

It is therefore another feature of an embodiment to provide a touch screen panel having a soft key that may have its brightness readily adjusted by adjusting one of the number and/or size of first openings between a soft key on a touch surface and a light source for realizing the soft key.

At least one of the above and other features and advantages may be realized by providing a touch screen panel including a transparent substrate, a picture region, a black matrix region around the picture region, and a soft key region disposed in a portion of the black matrix region defined on the transparent substrate, a black matrix corresponding to the black matrix region on one side of the transparent substrate and having a first opening in the soft key region, an overcoating layer on one side of the transparent substrate including the upper portion of the black matrix, a plurality of conductive sensing cells at least in the picture region on the overcoating layer, and position detection lines formed in the black matrix region on the overcoating layer and connected with the conductive sensing cells, wherein a soft key is implemented in the soft key region by disposing a light source under the first opening in the black matrix.

Each soft key may have a corresponding first opening. The first opening may include a pattern of opaque portions therein. The pattern may include a linear pattern.

The openings may be formed to correspond to each soft key that is implemented in the soft key region, and a plurality of slits may be formed in one opening corresponding to one soft key.

In addition, one or more conductive sensing cells may be formed in the soft key region on the over-coating layer.

In addition, the source of light may be set as a source of light for a special soft key or a backlight disposed under the touch screen panel.

In addition, the transparent substrate may be set as a window substrate disposed in the uppermost region of the substrates included in the image display device. The black matrix, the over-coating layer, the conductive sensing cells and the position detection lines may be formed under side opposite to a touch side of the transparent substrate.

At least one of the above and other features and advantages may also be realized by providing a display panel including a transparent substrate, a picture region, a black matrix region around the picture region, and a soft key region disposed in a portion of the black matrix region defined on the transparent substrate, a black matrix formed to correspond to the black matrix region on one side of the transparent substrate and having a first opening in the soft key region, and an overcoating layer on one side of the transparent substrate including the upper portion of the black matrix, wherein a soft key is implemented in the soft key region by disposing a light source under the first opening in the black matrix.

According to an embodiment of the present invention, the opening corresponding to the soft key is formed in the black matrix disposed in the edge portion of the screen region, and light irradiates the opening, thereby implementing the key. Thus, as the soft key is implemented when forming the black matrix of the touch screen panel, manufacturing processing may be simplified and manufacturing cost may be reduced.

Further, by controlling a number and/or size of the slits or apertures disposed in the openings, brightness control of the soft key may be readily realized.

In addition, when the image display device is switched off, the soft key may be black as the screen image as the soft key is not irradiated, so that the sense of unity in colors may be achieved. For this reason, the appearance of the image display device may be improved.

In addition, if the transparent substrate of the touch screen panel is integrally implemented with the window substrate of the image display device employing the touch screen panel, a thickness of the image display device may be reduced.

BRIEF DESCRIPTION OF THE DRAWINGS

The above and other features and advantages will become more apparent to those of ordinary skill in the art by describing in detail exemplary embodiments with reference to the attached drawings, in which:

FIG. 3 illustrates a plan view and a cross-sectional view showing a soft key according to various embodiments.

DETAILED DESCRIPTION

Figure 1:
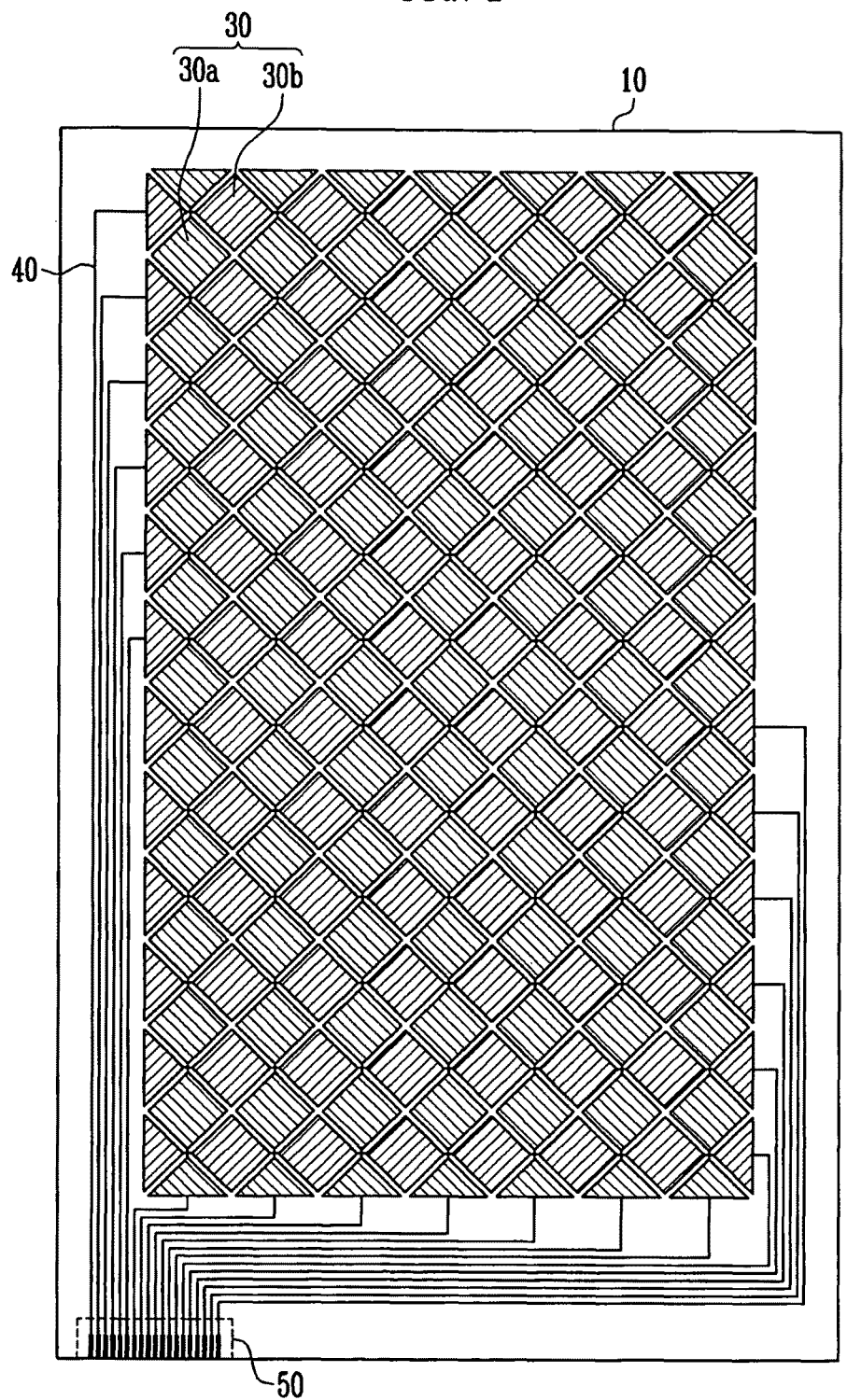
FIG. 1 illustrates a schematic plan view of an example of a touch screen panel.

Korean Patent Application No. 10-2010-0029949, filed on Apr. 1, 2010, in the Korean Intellectual Property Office, and entitled: "Touch Screen Panel" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a schematic plan view of an example of a touch screen panel. Referring to FIG. 1, a touch screen panel may include a transparent substrate 10, a plurality of conductive sensing cells 30 formed on the transparent substrate 10, and position detection lines 40 connecting the conductive sensing cells 30 with an external driving circuit through a pad unit 50.

The transparent substrate 10, serving as a base member of the touch screen panel, may be formed of a transparent substrate material, e.g., polyethylene terephthalate (PET) or an acryl. The adjective "transparent" inclusively means 100% transparency and high transmittance in the visible region, i.e., a material suitable for use as a display window.

The conductive sensing cells 30 may be made of a transparent electrode material, e.g., indium-tin-oxide (ITO), in a touch active region at one side of the transparent substrate 10. The conductive sensing cells 30 may include first sensing cells 30a connected in a first direction and second sensing cells 30b connected in a second direction, orthogonal to the first direction.

The first sensing cells 30a may be connected with each other in the first direction, e.g., in the column direction, and connected with the position detection lines 40 in each column. The second sensing cells 30b may be connected with each other in a second direction different from the first direction, for example, the row direction, between the first sensing cells 30a to be insulated from the first sensing cells 30a, and are connected with the position detection lines 40 in each row.

The first sensing cells 30a and the second sensing cells 30b may be respectively connected by first connecting patterns and second connecting patterns (not shown), with insulating layers therebetween, on the same layer, or may be disposed in different layers, with insulating layers therebetween.

The position detection lines 40 connect the sensing cells 30 with an external driving circuit (not shown), such as a position detection circuit, through the pad unit 50. The position lines 40 are disposed in a black matrix region at the edge portions of a touch screen panel without a touch active region where an image is displayed. Thus, as they are not in the display region, the position detection lines 40 may be made from a large selection of materials. For example, the position detection lines 40 may be made of a low-resistance material, such as Mo, Ag, Ti, Cu, Al, Mo/Al/Mo, and so forth, in addition to the transparent electrode material used for the sensing cells 30.

The touch screen panel described above is a capacitive type touch screen panel. When a contact object, e.g., a person's hand, a stylus pen, and so forth, contacts the touch screen panel, a change of electrostatic capacitance corresponding to the contact position is transmitted to the driving circuit (not shown) from the sensing cells 30 through the position detection lines 40 and the pad unit 50. The change in electrostatic capacity is converted into an electric signal by an X- and Y-input process circuit (not shown), such that a position of the contact is determined.

Figure 2:
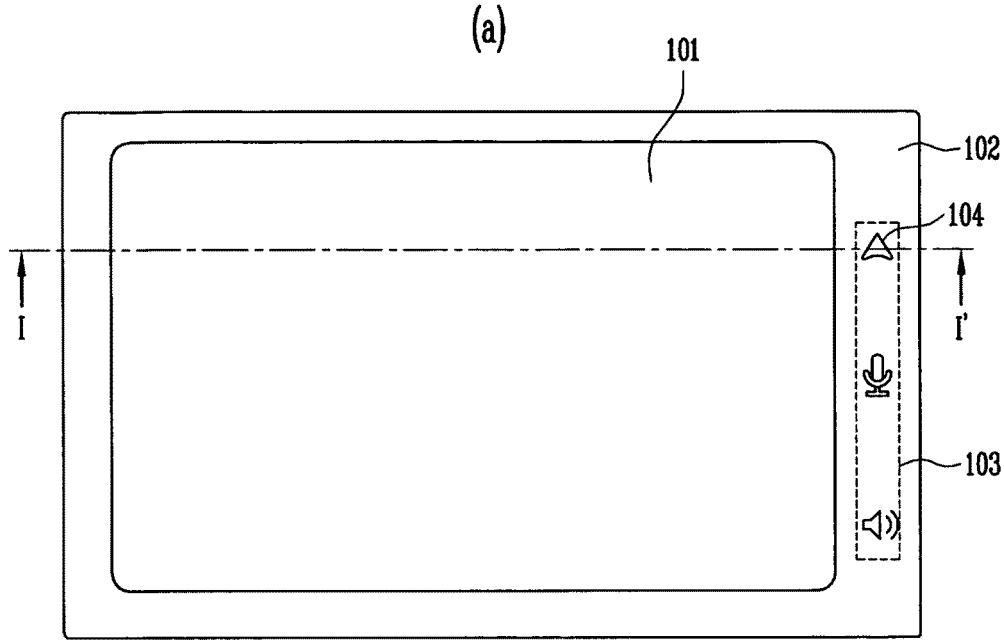
FIG. 2 illustrates a plan view and a cross-sectional view showing a touch screen panel according to an embodiment.
Figure 2:
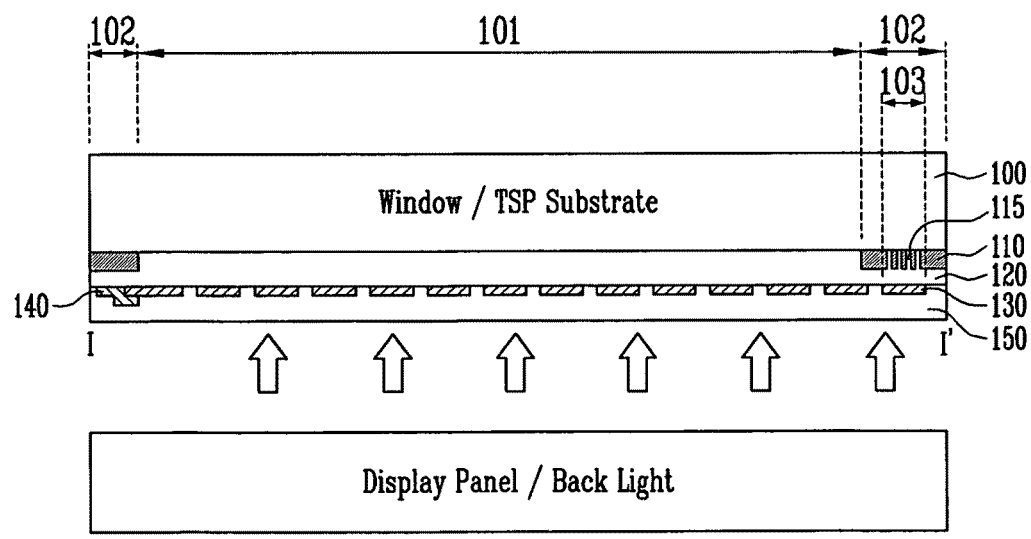

FIG. 2 illustrates a plan view (a) and a cross-sectional view (b) of the touch screen panel according to an embodiment. In FIG. 2, the plan view (a) schematically shows an image display device equipped with the touch screen panel according to the present embodiment. In FIG. 2, the cross-sectional view (b) schematically shows an example of a cross section taken along line I-I' of the plan view (a). The display panel disposed under the touch screen panel may be implemented in various types, e.g., an organic light emitting display panel or a liquid crystal display panel. As the configuration of display panels is well known, a detailed description thereof is not provided.

Referring to FIG. 2, the touch screen panel according to the embodiments of the present invention includes the transparent substrate 100, the black matrix 110 formed along the edge portion of one side of the transparent substrate 100, the over-coating layer 120 formed on the one side of the transparent substrate 100 including upper region of the black matrix 110, the conductive sensing cells 130 and the position detection lines 140 on the over-coating layer 120, a protection layer 150 on the transparent substrate 100 including upper regions of the conductive sensing cells 130 and the position detection lines 140.

As shown in the plan view (a) of FIG. 2, a transparent substrate 100 of the touch screen panel may be divided into picture region 101, a black matrix region 102 around the picture region 101, and a soft key region 103 disposed at a portion inside the black matrix region 102 at one side of the picture region 101.

As shown in the cross-sectional view (b) of FIG. 2, the touch screen panel according to the present embodiment may include the transparent substrate 100, a black matrix 110 along an edge, e.g., an entire periphery, of the transparent substrate 100, an overcoating layer 120 on the transparent substrate 100 including the upper portion of the black matrix 110, conductive sensing cells 130 on the overcoating layer 120, a position detection line 140 on the overcoating layer 120 and connected to the conductive sensing cells 130, and a protective layer 150 formed on the transparent substrate 100 including upper portions of the conductive sensing cells 130, and the position detection lines 140. These elements may be formed on a side of the transparent substrate 100 opposite a touch side, i.e., where contact for input is to occur.

In the particular embodiment described above, the transparent substrate 100 is to have components of the touch screen panel formed thereon, but embodiments are not limited thereto. Alternatively, the transparent substrate 100 may be a window substrate positioned as an uppermost substrate in the image display device employing the touch screen panel. In other words, an integrated touch screen panel, i.e., using the window substrate as the transparent substrate 100, may be implemented by forming patterns of the touch screen panel on the window substrate. Thus, a thickness of the image display device employing the touch screen panel may be reduced.

The soft key region 103 is disposed in part within the black matrix region 102 of one side of the screen region, and can implement a display key as a type of the soft key 104 to be displayed with a function key, such as a menu key or a volume key, or a special symbol.

The black matrix 110 corresponds to the black matrix region 102 on one side of the transparent substrate 100. In particular, the black matrix 110 is disposed around the picture region 101 to overlap the patterns, such as the position detection lines 140, so these patterns are obscured form the viewing side. The black matrix 110 of the present embodiment has at least one opening 115 formed in a region corresponding to the soft key 104 formed in the soft key region 103. Openings 115 are formed to correspond to the soft keys 104 disposed in the soft key region 103, respectively. One opening 115 may be included in each soft key 104 or a plurality of separate openings 115 may be used for each soft key 104.

The overcoating layer 120 is formed on one side of the transparent substrate 100 including the upper portion of the black matrix 110. The overcoating layer 120 may be a transparent insulating substrate and may be formed over the entire surface of one side of the transparent substrate 100 including the upper portion of the black matrix 110.

The conductive sensing cells 130 are formed at least in the picture region 101, i.e., screen, on the over-coating layer 120, and when a key to be provided with touch input among the soft key 104 formed in the soft key region 103, i.e., a function key, etc is included, the conductive sensing cells 130 are also formed in the region corresponding to the function key so that the touch event is sensed as an input signal.

In other words, the conductive sensing cells 130 may be of course formed in the soft key region 103 of the screen region 101 on the over-coating layer 120, but may not be positioned under the soft key set as the display key for displaying a special symbol.

The conductive sensing cells 130 are made from the transparent electrode material to be penetrated with light from a special source of light (now shown) or the display panel positioned under the region, and are connected to the position detection lines 140 so that the touch event can be sensed as the input signal.

Meanwhile, the conductive sensing cells 130 can be connected to the position detection lines 140 in each row or column. However, for the ease of description, connecting patterns that connect the conductive sensing cells 130 in each row or column and insulating layers disposed between the connecting patterns are not shown in FIG. 2.

The position detection lines 140 are formed in the black matrix region 102 on the over-coating layer 120 and connected to the conductive sensing cells 130, such that the touch input according to the conductive sensing cells 130 are transmitted to the driving circuit that has not shown.

The position detection lines 140 are formed in the black matrix region 102 on the overcoating layer 120 and connected with the conductive sensing cells 130, such that they transmit touch inputs from the conductive sensing cells 130 to the driving circuit (not shown).

In the present embodiment, a light source is disposed under the soft key region 103, i.e., under the first opening 115 of the black matrix 110, thereby implementing the soft key 104 in the soft key region 103.

The openings 115 are formed to be corresponding to the soft keys 104 disposed in the soft key region 103, respectively. One opening can be included in each soft key 104, or a plurality of separated openings can be included in each soft key 104. The detailed description about the mentioned content will be described hereinafter with reference to the embodiments as deputed in FIG. 3.

Meanwhile, the source of light for implementing the penetration soft key 104 may use a source of light on the display panel disposed under the touch screen panel, i.e., the back light of the liquid display panel device, or a source of light for the soft key, such as white or color LED (now shown) to be separately included for implementing the soft key 104.

According to the embodiments mentioned above, the openings 115 corresponding to the soft keys 104 are formed in the black matrix 110 disposed in the edge portion of the screen region 101, and light irradiates to the openings, thereby implementing the soft keys. For this reason, implementing the openings 115 along with the soft key 104 when forming the black matrix 110 of the touch screen panel may simplify the process and reduce costs.

In addition, when the image display device is switched off, the soft key 104 may be as black as the screen region 101 because light does not irradiate to the soft key 104. For this reason, the sense of unity in colors may be achieved in the whole image display device and the appearance of the image display device may be improved.

In addition, if the transparent substrate 100 of the touch screen panel is integrally implemented with the window substrate of the image display device employing the touch screen panel, a thickness of the image display device can be thinned, and also a manufacturing efficiency can be improved by the simplicity of the processes for manufacturing, the reduction of costs, and the like.

FIG. 3 illustrates a plan view and a cross-sectional view showing the touch screen panel according to various embodiments (a), (b), and (c) of a soft key. Referring to FIG. 3, one or more openings 115 corresponding to each soft key 104 are included in the black matrix 110.

For example, as depicted in (a) in FIG. 3, one opening 115a may be included in a shape corresponding to each soft key 104a in the black matrix 110. In other words, the opening 115a corresponding to each soft key 104a may be fully open, i.e., all material for the black matrix 110 may be removed in the opening 115a.

Alternatively, as depicted in (b) and (c) in FIG. 3, openings 115b and 115c having opaque portions may be included in the shape corresponding to each soft key 104b, 104c in the black matrix 110, and may be implemented as a shape forming a plurality of slits or apertures (the plurality of openings 115b, 115c are separately formed inside region corresponding to each soft keys) separating opaque slits or patterns therein. In this case, the brightness of the soft keys 104b and 104c may be easily controlled by controlling a number and/or size of the slits disposed in the openings 115b and 115c. In other words, some of the material used for the black matrix 110 may remain in the openings 115b and 115c, forming an opaque pattern having apertures therein.

Although an image display device having a built-in touch screen panel equipped with a soft key was described above as an embodiment for exemplifying a soft key that can be implemented as a function key, example embodiments are not limited thereto.

For example, the spirit of the present invention, which implements a soft key by forming the first opening in the first black matrix formed around the picture region, and disposing the light source under the first opening, may be applied to an image display device without a built-in touch screen panel.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A touch screen panel, comprising:
a transparent substrate;
a picture region, a black matrix region around the picture region, and a soft key region disposed in a portion of the black matrix region defined on the transparent substrate;
a black matrix corresponding to the black matrix region on one side of the transparent substrate and having a first opening in the soft key region;
an overcoating layer on one side of the transparent substrate including an upper portion of the black matrix;
a plurality of conductive sensing cells at least in the picture region on the overcoating layer; and
position detection lines formed in the black matrix region on the overcoating layer and connected with the conductive sensing cells;
at least one soft key implemented in the soft key region by the first opening in the black matrix; and
a light source under the first opening in the black matrix, wherein the at least one soft key is configured to allow light to pass therethrough, when light from the light source is irradiated to the first opening in the black matrix, and
wherein the black matrix is on a lower surface of the transparent substrate, the lower surface of the transparent substrate being opposite to a touch surface of the transparent substrate, and a portion of the black matrix being between the first opening and the picture region.

2. The touch screen panel as claimed in claim 1, wherein each soft key has a corresponding first opening, the first opening overlapping and defining the corresponding soft key.

3. The touch screen panel as claimed in claim 2, wherein the first opening includes a pattern of opaque portions therein.

4. The touch screen panel as claimed in claim 3, wherein the pattern includes a linear pattern.

5. The touch screen panel as claimed in claim 1, further comprising one or more conductive sensing cells in the soft key region on the over-coating layer, the one or more conductive sensing cells being under corresponding function keys.

6. The touch screen panel as claimed in claim 1, further comprising a light source under the first opening in the black matrix, wherein the light source is a backlight of a liquid crystal display device disposed under the touch screen panel.

7. The touch screen panel as claimed in claim 1, further comprising a light source under the first opening in the black matrix, wherein the light source is a specific light source for the soft key.

8. The touch screen panel as claimed in claim 1, wherein the transparent substrate is a window substrate at an uppermost substrate in an image display device, a first surface of the transparent substrate defining a touch surface, and the black matrix, the overcoating layer, the conductive sensing cells, and the position detection lines are formed on a second surface of the transparent substrate opposite to the touch surface of the transparent substrate.

9. A display panel, comprising:
a transparent substrate;
a picture region, a black matrix region around the picture region, and a soft key region disposed in a portion of the black matrix region defined on the transparent substrate;
a black matrix formed to correspond to the black matrix region on one side of the transparent substrate and having a first opening in the soft key region;
an overcoating layer on one side of the transparent substrate including an upper portion of the black matrix;
at least one soft key in the soft key region; and
a light source under the first opening in the black matrix, wherein the at least one soft key is configured to allow light to pass therethrough, when light from the light source is irradiated to the first opening in the black matrix, and
wherein the black matrix is on a lower surface of the transparent substrate, the lower surface of the transparent substrate being opposite to a touch surface of the transparent substrate, and a portion of the black matrix being between the first opening and the picture region.

10. The touch screen panel as claimed in claim 1, wherein the black matrix is between the transparent substrate and the overcoating layer.

11. The touch screen panel as claimed in claim 10, wherein the black matrix is enclosed between the transparent substrate and the overcoating layer, the overcoating layer being in direct contact with each of the black matrix and the transparent substrate.

12. The touch screen panel as claimed in claim 10, wherein the overcoating layer separates between the black matrix and the conductive sensing cells.

13. The touch screen panel as claimed in claim 1, wherein the first opening in the black matrix extends through an entire thickness of the black matrix, the thickness of the black matrix being measured along a normal to the transparent substrate.

14. The touch screen panel as claimed in claim 13, wherein a width of the first opening in the black matrix is smaller than a width of the black matrix, the widths of the first opening and black matrix being perpendicular to the thickness of the black matrix.

15. The touch screen panel as claimed in claim 1, wherein the soft key region and black matrix region overlap, a width of the soft key region being smaller than a width of the black matrix region, the widths of the soft key region and black matrix region being perpendicular to a normal to the transparent substrate.

16. The touch screen panel as claimed in claim 15, wherein the soft key is only in the soft key region, the black matrix is only in the black matrix region, and the black matrix defines a contour of each soft key.

17. The touch screen panel as claimed in claim 2, further comprising a light source under the first opening in the black matrix, light from the light source through the first opening defining a contour of the corresponding soft key.

18. The touch screen panel as claimed in claim 1, wherein the conductive sensing cells and the transparent substrate are on opposite surfaces of the overcoating layer.

19. The touch screen panel as claimed in claim 1, wherein the position detection lines are completely under the black matrix.

* * * * *